2,714,583

CONVERSION OF CARBON MONOXIDE AND WATER TO HYDROCARBONS IN THE PRESENCE OF METAL MOLYBDITE CATALYSTS

Frank S. Fawcett, Wilmington, Del., assignor to E. I. du Pont de Nemours and Company, Wilmington, Del., a corporation of Delaware No Drawing. Application January 23, 1952, Serial No. 267,910

5 Claims. (Cl. 260—2)

This invention relates to a new method for obtaining high molecular weight hydrocarbons.

In the Arnold and Carnahan patent, U. S. 2,572,300, new catalytic compositions, containing molybdenum and having a relatively large surface area per unit of mass, were disclosed. These catalysts comprised molybdites of metals whose ions form soluble compounds in excess aqueous ammonia, e. g. Zn, Cu, Ni, Co, said molybdites having a metal substituted for hydrogen in the formula $H_2MoO_n$, where $n$ is from 2 to 3 inclusive. In patent application U. S. Serial No. 208,662, filed January 30, 1951, by H. R. Arnold and J. E. Carnahan, metal tungstites which are metal salts of an acid of the general formula $H_2WO_n$, in which $n$ is 2 or 3, are described. These catalysts are effective in the manufacture of solid high molecular weight hydrocarbons from carbon monoxide and hydrogen, as disclosed in U. S. patent applications Serial No. 236,086, filed July 10, 1951, now U. S. Patent 2,652,372, by M. W. Farlow and E. C. Herrick, and Serial No. 208,661, filed on January 30, 1951, and now abandoned, by H. R. Arnold and E. C. Herrick. An object of the present invention is to provide still other novel and useful processes, employing these new catalysts.

It has been discovered in accordance with this invention that the catalysts hereinabove described are very effective in the synthesis of polymethylenes from carbon monoxide and water, without introduction of hydrogen from an external source. The polymethylenes thus obtained are solid under normal conditions; they are in general orientable on cold drawing, and capable of being spun into fibers.

This invention accordingly provides a new method for obtaining hydrocarbons, and particularly high molecular weight hydrocarbons, which consists in reacting, as initial sole reactants, carbon monoxide and water in the presence of at least one metal molybdite or tungstite. The mol ratio of carbon monoxide to water is generally at least 3:1.

In one of its embodiments, the process of this invention is carried out by charging a pressure reactor with water and catalyst and sweeping with oxygen-free nitrogen, cooling to 0° C., and evacuating. Thereafter carbon monoxide is injected to a pressure such that at a temperature between 125° C. and 350° C. the total pressure is at least 200 atm., and the charge agitated. The selected conditions of temperature and pressure are maintained until there is no further evidence of reaction as reflected by cessation of pressure drop. If desired, however, the reaction can be stopped after the desired pressure drop has occurred. Throughout the reaction period the pressure within the reactor is maintained by re-pressuring with carbon monoxide. After completion of the reaction, the reactor is permitted to cool, opened, and the contents discharged and filtered. The products are separated by filtration, distillation, extraction, or other means known to those skilled in the art.

The examples which follow are submitted to illustrate and not to limit this invention.

Example I

A 400 ml. silver-lined shaker tube was flushed with nitrogen and in an atmosphere of nitrogen 20 parts of nickel molybdite ($MiMoO_2$) catalyst and 50 parts of distilled water were charged. The tube was cooled and evacuated and then pressured with pure carbon monoxide and heated at 200° C. under 1000 atm. pressure of carbon monoxide for 15 hours. The absorption of gas amounted to a pressure drop of 370 atm. After cooling to room temperature the gas remaining in the tube was bled through a valve and the non-gaseous contents of the apparatus removed. The reaction mixture was centrifuged, washed with methanol, and the dried material extracted with boiling benzene. On pouring the hot benzene extract into methanol there was precipitated 0.44 part of white hydrocarbon polymer. Further extraction with boiling xylene and precipitation with methanol gave 1.91 parts of white hydrocarbon polymer.

*Analysis.*—Calcd. for $(CH_2)_n$: C, 85.62; H, 14.38. Found: C, 83.35; H, 13.78.

This polymer had a melting point of 124–130° C., and a relative viscosity of 1.101, and an inherent viscosity of 0.96 when measured at 0.1% concentration in tetralin at 125° C. This polymer was manually spun to give fibers which were orientable on cold drawing, and films formed by compression molding were flexible and showed a tensile strength of 4035 lbs./sq. in. In addition to the solid hydrocarbon product described above, lower hydrocarbons were obtained, particularly methane, ethane, and others.

In place of nickel molybdite in the above example, there may be used cobalt molybdite or nickel or cobalt tungstite.

Example II

The above example was repeated using 100 parts of water and there was obtained 3.49 parts of hydrocarbon polymer, C, 84.98%; H, 13.91%; relative viscosity, 1.068; inherent viscosity, 0.66; melting point 112.6–128.4° C., along with lower hydrocarbons.

Example III

The procedure of Example II was repeated but the reaction temperature was 175° C. and there was obtained in addition to lower hydrocarbons 1.26 parts of solid hydrocarbon polymer. C, 84.20; H, 13.81; relative viscosity 1.095; inherent viscosity 0.91; melting point 117.4–128.4° C.

Example IV

The procedure of Example II was repeated with the addition of 25 parts of solid potassium hydroxide as a modifier for the water prior to the reaction and after separation from lower hydrocarbons and unreacted water, there was obtained 3.48 parts of polymer.

These examples have illustrated preferred embodiments and are not to be construed as limiting this invention.

The process of this invention can be operated as a batch operation, as illustrated by the working examples, or as a semi-continuous or continuous operation. The latter is the preferred method in large scale operation because it permits re-cycling of unconverted carbon monoxide and thus operates to reduce costs.

The mole ratio of carbon monoxide to water is preferably at least 3:1. If desired, however, ratios either above or below this value are employed. Actually, the preferred method involves placing water in the reactor and then pressuring to a predetermined pressure with carbon monoxide. The pressure is maintained at the selected level by periodic injections of carbon monoxide.

As illustrated in Example IV modifying agents, e. g., alkaline reacting materials such as an alkali metal hydroxide can be added to the water. In other instances phosphoric acid, alkyl phosphoric esters, and other acidic agents may be added to modify or control the distribution of hydrocarbon products.

Pressure is an important variable in determining the nature of the products obtained. As a rule, it is preferred to operate at pressures which are at least 200 atmospheres, and especially at pressures in excess of 500 atmospheres because the best yields of desired high molecular weight polymethylenes are thereby obtained. Pressures as low as 1 atmosphere can be used, however, provided that compensating adjustments in the operating temperature are made. The upper pressure limit is not critical and is determined by the mechanical limitations of the equipment used. Because pressures above 5000 atmospheres do not lead to improved yields, or to better molecular weight distribution in the products, it represents a practical upper limit of pressure.

The time of reaction depends upon such interdependent variables as temperature, pressure, and amount and type of catalyst used. Under preferred conditions for batch operations the reaction reaches completion in from 5 to 30 hours.

The catalysts used in the practice of this invention are metal salts of an acid of the general formula $H_2MO_n$, in which $n$ is 2 or 3 and M is tungsten or molybdenum.

One class of these catalysts is constituted by the products disclosed and claimed in U. S. Patent 2,572,300. In these products the metal which is substituted for hydrogen in the acid formula $H_2MO_n$ (M in that instance being molybdenum) is characterized in that the ions thereof form by reaction with aqueous ammonia, a compound selected from the group consisting of oxides and hydroxides which are soluble in the presence of excess aqueous ammonia, and oxides and hydroxides which are soluble in water. These molybdites exist in two series; in the first the molybdenum is present in the quadrivalent state corresponding to the oxide $MoO_2$ and the hypothetical acid $H_2MoO_3$, and in the second the molybdenum is present in the bivalent state corresponding to the oxide MoO and the hypothetical acid $H_2MoO_2$. Examples of these molybdites are copper molybdite, $CuMoO_3$, nickel molybdite, $NiMoO_2$, and cobalt molybdite, $CoMoO_2$ and $CoMoO_3$. These molybdites may contain promoters or modifiers, such as, cadmium, barium, chromium, thorium, etc., if desired. Preferred molybdites because of their high degree of activity and selectivity are the molybdites of nickel, cobalt, and copper. These molybdites may be employed in the form of pellets, or as finely divided powders, and they may be used as such or extended on inert supports such as charcoal, alumina, silica, etc. The particular physical form of the catalyst for maximum activity depends upon the conditions under which the hydrogenation reaction is to be conducted. Thus, for continuous operation it is best to have the catalyst in the form of pellets to minimize mechanical losses. If the process is to be operated as a batch operation, it is best that the catalyst be in finely divided form because in that way maximum catalyst activity is obtained. These molybdites may be blended with tungstites of the type disclosed and claimed in the copending application of H. R. Arnold and J. E. Carnahan, U. S. Serial No. 708,662, filed January 30, 1951. In order to aid in the dissipation of the heat of reaction and thus render it easier to control the reaction temperature, it is advantageous to mix the catalyst with copper, iron, aluminum, etc., pellets or powder.

The preparation of a nickel molybdite catalyst is illustrated below:

Seventeen-hundred sixty-six grams of ammonium paramolybdate $[(NH_4)_6Mo_7O_{24}.4H_2O]$, equivalent to 10 moles of $MoO_3$, was dissolved in 5000 cc. of distilled water and neutralized by the addition of 900 cc. of 28% aqueous ammonia. The resulting solution of ammonium molybdate $[(NH_4)_2MoO_4]$ containing 1.9 moles of excess ammonia, was then added, with stirring, at room temperature to a solution of nickel nitrate, prepared by dissolving 2908 grams of nickel nitrate hexahydrate $Ni(NO_3)_2 6H_2O$, equivalent to 10 moles of nickel, in 5000 cc. of distilled water. A pale green precipitate was formed in an acid slurry having a pH of approximately 4 by alkaline-acid paper. The pH of the slurry was adjusted to 7 (Beckman pH meter) by the addition of 500 cc. of 28% aqueous ammonia. The precipitate was then cooled, filtered, dried, and calcined at 400° C. for 18 hours. The calcined product, by analysis, was found to contain 23.2% nickel and 46.4% molybdenum. The calcined product was reduced in hydrogen at gradually increasing temperatures up to 550° C. The reduced product was highly pyrophoric and glowed on exposure to air. Analysis showed the reduced product to contain 26.66% nickel and 33.1% molybdenum, corresponding to $NiMoO_2O.2MoO_3$.

Another class of catalyst is constituted by the metal tungstites disclosed in the copending application of H. R. Arnold and J. E. Carnahan, U. S. Serial No. 208,662, filed January 30, 1951. Like the molybdites, these tungstites exist in two series. In one the tungsten is present in one quadrivalent state corresponding to the oxide $WO_2$ and one hypothetic and $H_2WO_3$ and in the other the tungsten is present in the bivalent state corresponding to the oxide WO and the hypothetic acid $H_2WO_2$. Examples of these tungstites are nickel tungstite, $NiWo_2$, cobalt tungstite, $CoWO_3$, etc.

The preparation of nickel tungstite is illustrated below:

Four moles of ammonium tungstate $[(NH_4)_2WO_4]$ in a 10% aqueous solution, prepared by dissolving 1080 g. of ammonium paratungstate $[(NH_4)_6W_7O_{24}.6H_2O]$ in 7000 cc. of water and 310 cc. of 28% aqueous ammonia at 85° C., was added with stirring to 4 moles of nickel nitrate in a 16% solution, prepared by dissolving 1163 g. of nickel nitrate hexahydrate $[Ni(NO_3)_2.6H_2O]$ in 6000 cc. of water at 85° C. A pale green precipitate was formed in a slurry having a pH of approximately 6. The pH of the slurry was adjusted to 7 at 75° C. by addition of 404 cc. of 28% aqueous ammonia. The resulting precipitate was washed, filtered, dried, and calcined at 400° C. The product thus obtained was charged into a furnace and heat treated at 400° C. in a stream of nitrogen at a space velocity of 390 l./hr. for 12 hours, cooled to room temperature in nitrogen and the product then reduced for 24–27 hours at 450–480° C. in hydrogen at a space velocity of 600–1,000 l./hr. The reduced product corresponded by analysis to nickel tungstite $(NiWO_2)$ containing a slight excess of $W_2O_3$.

The amount of catalyst used depends upon such interdependent variables as temperature, pressure, general method of operation, catalyst activity, etc. As a rule, in batch operation the amount of catalyst employed is between 1.5% and 30% and preferably between 2.5% and 20% by weight of the water.

The temperature at which the reaction is effected lies in the range of 125 to 350° C. Because good reaction rates with best yields of hydrocarbons are obtained in the range of 150°–250° C., this range embraces the preferred operating temperature conditions.

The process of this invention makes it possible for the first time to convert carbon monoxide to hydrocarbons, particularly to solid hydrocarbon polymers, without employing hydrogen in the initial reaction charge. It is different therefore from prior methods in which carbon monoxide has been converted to high molecular weight hydrocarbon polymers by including hydrogen in the initial charge.

I claim:

1. A process for preparing normally solid hydrocarbons which comprises reacting carbon monoxide and water, as sole initial reactants, in the presence of a a catalyst selected from the group consisting of the metal molybdites and tungstites, which are metal salts of an acid of the formula $H_2MO_n$, wherein $n$ is from 2 to 3, inclusive, and M is selected from the group of molybdenum and tungsten, the metal substituted for hydrogen in the said formula being characterized in that the ions thereof form by reaction of aqueous ammonia a compound selected from the group consisting of oxides and hydroxides which are soluble in the presence of excess aqueous ammonia, and oxides and hydroxides which are soluble in water, at a temperature in the range of 125° C. to 350° C. under a pressure of at least 200 atmospheres and thereafter separating the said hydrocarbons from the resulting mixture.

2. A process for preparing normally solid hydrocarbons which comprises reacting carbon monoxide and water, as sole initial reactants, in the presence of a catalytic quantity of a metal molybdite which is a metal salt of an acid of the formula $H_2MoO_n$, in which $n$ is from 2 to 3, inclusive, the metal substituted for hydrogen in the said formula being characterized in that the ions thereof form by reaction of aqueous ammonia a compound selected from the group consisting of oxides and hydroxides which are soluble in the presence of excess aqueous ammonia, and oxides and hydroxides which are soluble in water, at a temperature in the range of 125° C. to 350° C. under a pressure in the range of 200 to 5000 atmospheres and thereafter separating the said hydrocarbons from the resulting mixture.

3. A process for preparing normally solid hydrocarbons which comprises reacting carbon monoxide and water, as sole initial reactants, in the presence of a catalytic quantity of nickel molybdite of the formula $NiMoO_2$, at a temperature in the range 125° C. to 250° C. under a pressure within the range of 200 to 5000 atmospheres and thereafter separating the said hydrocarbons from the resulting mixture.

4. A process for preparing normally solid polymethylenes which comprises reacting carbon monoxide and water as sole initial reactants in the presence of a catalytic quantity of nickel molybdite of the formula $NiMoO_2$, at a temperature in the range of 125° C. to 250° C. under a pressure within the range of 200 to 5000 atmospheres, the quantity of catalyst being from 2.5 to 20% of the weight of the water, whereby a polymethylene which is normally solid is obtained and thereafter separating the said polymethylene from the resulting mixture.

5. A process for preparing normally solid polymethylenes which comprises reacting carbon monoxide and water as sole initial reactants in the presence of a catalytic quantity of nickel molybdite of the formula $NiMoO_2$, the mole ratio of carbon monoxide to water being initially at least 3:1, at a temperature in the range 150° to 250° C. under a pressure within the range of 200 to 500 atmospheres, said water having dissolved therein an alkali metal hydroxide, whereby a polymethylene which is normally solid is obtained and thereafter separating the said polymethylene from the resulting mixture.

References Cited in the file of this patent

UNITED STATES PATENTS

| | | |
|---|---|---|
| 2,213,415 | Slatineanu | Sept. 3, 1940 |
| 2,564,696 | Keith et al. | Aug. 21, 1951 |
| 2,579,663 | Gilbert et al. | Dec. 25, 1951 |

OTHER REFERENCES

Furnas; Rogers' Industrial Chemistry, 6th ed., vol. I, N. Y., 1942, pages 154, 155, 617, and 618.